(12) United States Patent
Gärtner et al.

(10) Patent No.: US 10,919,776 B2
(45) Date of Patent: Feb. 16, 2021

(54) ULTRA FINE MILK OF LIME COMPOSITION

(71) Applicant: S. A. Lhoist Recherche et Developpement, Ottignies-Louvain-la-neuve (BE)

(72) Inventors: Robert Sebastian Gärtner, Buizingen (BE); Luis Alfredo Diaz Chavez, Beauvechain (BE)

(73) Assignee: S. A. Lhoist Recherche et Developpement, Ottignies Louvain-la-neuve (BE)

( * ) Notice: Subject to any disclaimer, the term of this patent is extended or adjusted under 35 U.S.C. 154(b) by 287 days.

(21) Appl. No.: 16/123,603

(22) Filed: Sep. 6, 2018

(65) Prior Publication Data

US 2019/0002301 A1 Jan. 3, 2019

Related U.S. Application Data

(62) Division of application No. 14/411,201, filed as application No. PCT/EP2013/068906 on Sep. 12, 2013, now Pat. No. 10,093,549.

(Continued)

(30) Foreign Application Priority Data

Sep. 12, 2012 (BE) .................... 2012/0602

(51) Int. Cl.
| | | |
|---|---|---|
| *C01F 11/02* | (2006.01) | |
| *C09C 1/02* | (2006.01) | |
| *B02C 17/20* | (2006.01) | |
| *B02C 23/08* | (2006.01) | |
| *C04B 22/06* | (2006.01) | |
| *C04B 2/04* | (2006.01) | |
| *B02C 17/18* | (2006.01) | |

(52) U.S. Cl.
CPC ............ *C01F 11/02* (2013.01); *B02C 17/186* (2013.01); *B02C 17/20* (2013.01); *B02C 23/08* (2013.01); *C04B 2/045* (2013.01); *C04B 22/064* (2013.01); *C09C 1/02* (2013.01); *C01P 2004/51* (2013.01); *C01P 2004/52* (2013.01); *C01P 2004/61* (2013.01); *C01P 2004/62* (2013.01); *C01P 2006/22* (2013.01); *C01P 2006/80* (2013.01)

(58) Field of Classification Search
CPC ....... B02C 17/186; B02C 17/20; B02C 23/08; C01F 11/02; C04B 2/045; C04B 22/064; C09C 1/02; C01P 2004/51; C01P 2004/52; C01P 2004/61; C01P 2004/62; C01P 2006/22; C01P 2006/80
USPC ....................................... 241/24.12
See application file for complete search history.

(56) References Cited

U.S. PATENT DOCUMENTS 2,034,797 A * 3/1936 Church .................... C09C 1/02
106/465
2,177,251 A * 10/1939 Hanahan .................. C09C 1/06
106/424

(Continued)

*Primary Examiner* — Shelley M Self
*Assistant Examiner* — Smith Oberto Bapthelus
(74) *Attorney, Agent, or Firm* — Whitaker Chalk Swindle & Schwartz PLLC; Charles Gunter (57) ABSTRACT

A composition of milk of lime comprising particles of slaked lime suspended in an aqueous phase, characterised in that said particles of slaked lime have a particle size described by a particle size distribution profile that is narrow and monomodal and the method of production thereof.

11 Claims, 3 Drawing Sheets

Related U.S. Application Data (60) Provisional application No. 61/719,622, filed on Oct. 29, 2012.

(56) References Cited

U.S. PATENT DOCUMENTS

| | | | | |
|---|---|---|---|---|
| 2,359,792 A | * | 10/1944 | Rex | C04B 2/102 423/169 |
| 2,408,647 A | * | 10/1946 | Huntzicker | C04B 2/02 423/176 |
| 2,416,064 A | * | 2/1947 | Patterson | C09C 1/34 106/14.39 |
| 2,419,094 A | * | 4/1947 | Sloan | C09C 1/34 106/453 |
| 2,663,646 A | * | 12/1953 | Huntzicker | C04B 28/10 106/793 |
| 2,694,620 A | * | 11/1954 | Lathe | C04B 2/102 423/169 |
| 2,784,062 A | * | 3/1957 | Locke | C04B 2/04 423/640 |
| 3,329,355 A | * | 7/1967 | Clary | B03D 1/021 241/5 |
| 4,013,602 A | * | 3/1977 | Delfosse | D21H 21/52 524/425 |
| 4,261,953 A | * | 4/1981 | Gisler | C04B 2/04 422/162 |
| 4,482,528 A | * | 11/1984 | Emmett | C04B 2/04 422/162 |
| 5,906,804 A | * | 5/1999 | Aral | C01F 5/14 423/265 |
| 5,954,276 A | * | 9/1999 | Hintikka | B02C 17/04 241/171 |
| 5,968,370 A | * | 10/1999 | Trim | B01D 21/01 210/723 |
| 6,269,952 B1 | * | 8/2001 | Watt | B01J 19/10 209/17 |
| 6,926,879 B2 | * | 8/2005 | Huege | C04B 2/04 241/24.1 |
| 7,662,229 B2 | * | 2/2010 | Kato | C04B 22/064 106/792 |
| 10,369,518 B2 | * | 8/2019 | Tate | B01J 20/3021 |
| 10,610,825 B2 | * | 4/2020 | Tate | B01J 20/041 |
| 2002/0022084 A1 | * | 2/2002 | Calhoun | B29B 9/14 427/215 |
| 2004/0028585 A1 | * | 2/2004 | Cardarelli | H01M 10/54 423/66 |
| 2005/0281728 A1 | * | 12/2005 | Liu | C01F 11/181 423/432 |
| 2006/0275203 A1 | * | 12/2006 | Chavez | C01F 11/00 423/594.16 |
| 2012/0152854 A1 | * | 6/2012 | Remy | C02F 11/14 210/724 |
| 2013/0269735 A1 | * | 10/2013 | Roetzel | B08B 3/102 134/40 |
| 2014/0041485 A1 | * | 2/2014 | Short | C22B 7/02 75/594 |
| 2015/0183652 A1 | * | 7/2015 | Gartner | B02C 23/08 516/88 |
| 2017/0016288 A1 | * | 1/2017 | Culver | C02F 1/38 |
| 2018/0264403 A1 | * | 9/2018 | Tate | C01F 11/02 |
| 2019/0002301 A1 | * | 1/2019 | Gartner | B02C 17/20 |

* cited by examiner

ULTRA FINE MILK OF LIME COMPOSITION

The present application is a divisional application of earlier filed U.S. patent application Ser. No. 14/411,201, filed Mar. 20, 2015, which is a 371 National Stage filing of International Application No. PCT/EP2013/068906, with an international filing date of Sep. 12, 2013, entitled "Ultra Fine Milk of Lime Composition" by the same inventors, which claimed priority from U.S. Provisional Application Ser. No. 61/719,622, filed Oct. 29, 2012, and from an earlier filed Belgian Application No. 2012/0602, filed Sep. 12, 2012.

The present invention relates to a composition of milk of lime comprising particles of slaked lime suspended in an aqueous phase and to the manufacturing process thereof.

Suspensions of particles of slaked hydrated lime sometimes also called milk of lime, cream of lime or lime slurry are widely used industrially as reagents in a multitude of applications, in particular in the neutralisation of waste water or acid effluent, pH adjustment and the mineralisation of potable (drinking) water, neutralisation of chemical reactions, for example, such as in the production of ethylene oxide or propylene, as a source of calcium or for precipitation, in the production of vitamin C, of citric acid and precipitated calcium carbonates (PCC), or also as adsorbent in the desulfurisation and the elimination of acid gases such as hydrochloric acid (HCL), in the flue gases.

Such suspensions of particles of slaked lime or milk of lime are commonly obtained by the slaking of quicklime with a large excess of water or forming a suspension of slaked lime powder. The resulting particles consist predominantly of calcium hydroxide.

Such slaked lime or calcium hydroxide may obviously contain impurities, that is, phases derived from $SiO_2$, $Al_2O_3$, $Fe_2O_3$, MnO, $P_2O_5$, $K_2O$ and/or $SO_3$, broadly representing tens of grammes per kilogram. Nevertheless, the amount of these impurities, expressed in the form of oxides of the above cited, does not exceed 5% by mass, preferably 3%, preferably 2% or even 1% of the mass of the inorganic mineral filler according to the invention. In particular, the slaked lime advantageously contains less than 1.0% by mass of $Fe_2O_3$, preferably less than 0.5% and preferably less than 0.3%.

This slaked lime may also contain calcium oxide that would not have been hydrated during slaking, just as it may contain calcium carbonate $CaCO_3$. The calcium carbonate may be from either the initial limestone from which the slaked lime is derived according to the invention (unburnt), or from a reaction of partial carbonation of the slaked lime in contact with air. The calcium oxide content in the slaked lime in the context of the present invention is generally less than 3% by mass, preferably less than 2% and in an advantageous manner less than 1%. The calcium carbonate content is less than 10% by mass, preferably less than 6% and in an advantageous manner less than 4%, and even more advantageously less than 3%.

This slaked lime may also contain magnesium oxide MgO or derived phases of types such as $Mg(OH)_2$ or $MgCO_3$, representing on the whole, tens of grammes per kilogramme. Nevertheless, the amount of these impurities, expressed in the form of MgO, advantageously does not exceed 5% by mass, preferably 3%, preferably 2% or even 1% of the weight of the inorganic mineral filler according to the invention.

The factors limiting the use of milk of lime in comparison with other potential reactants are generally linked to its viscosity and its rate of reaction or neutralisation in the reaction medium of the application.

Quite understandably, a high rate of reaction is desired as it enables the establishment of more rapid methods and therefore shorter processing periods, and in an industrial context, would make it possible for smaller probably less expensive equipment to be used for the reaction and/or industrial equipment having higher production capacity. In addition, in certain processes a predetermined minimum rate of reaction is often required in order to provide a product having the desired qualitative characteristics.

Unfortunately, the viscosity is generally a limiting factor to allow the efficient use of fine milk of lime. Indeed, the suspension must be pumped so as to be fed from one point to the other and dosed, which is not easy for highly viscous suspensions. In addition, highly viscous suspensions generally diminish the quality of the dispersion, which has an impact on the reaction rates observed for such applications since it takes more time and energy to disperse the particles of slaked lime in the reaction medium.

The viscosity and the rate of reaction of milk of lime are two quantitative measures that are related to the size of particles. Particles having a reduced particle size generally have higher rates of reaction, but also result in high viscosity of the suspension in which they are found, particularly when the solids content has to be increased.

The rate of reaction of the particles of slaked lime is commonly linked to the rate of dissolution of particles of slaked lime or calcium hydroxide, which increases as the outer surface of the particles increases and the size of the particles thus decreases. By virtue of the same logic, the viscosity increases along with increasing solids content and decreasing particle size. This is generally explained by the fact that the particles content per unit of volume increases. Therefore, an increasing number of particles are close to each other, and thus interact with each other and with the water. Such interactions are considered by some authors as being mainly of an attractive nature due to the low surface charge of the slaked lime particles and their ability to form hydrogen bonds with water molecules. These interactions then lead to an increase in cohesion within the suspension and therefore to an increase in viscosity.

In the context of the present invention, it is necessary to distinguish the reactivity of milk of lime which represents the rate of dissolution of particles of hydrated lime from the reactivity of quicklime, that is to say the rate of reaction of quicklime with water to produce slaked lime and thus for example a milk of lime.

In fact, the reactivity of quicklime is generally characterised and measured by the procedure disclosed in the European standard EN459-2 and often quantified by $t_{60}$, the time required for a volume of 600 cm$^3$ of water initially at 20° C. to reach 60° C., on the basis of the addition of 150 g of quicklime.

With respect to the reactivity of milk of lime it is characterised for the purposes of the present invention according to the work of van Eekeren et al. disclosed in "'Improved milk-of-lime for softening of drinking water', M W M van Eekeren, J A M van Paassen, C W A M Merks, KIWA NV Research and Consultancy, Nieuwegein, September 1993" produced and distributed by KIWA, the Royal Netherlands Water Research Institute (KIWA NV Research and Consultancy, Groningenhaven 7, PO Box 1072, 3430BB Nieuwegein.)

For the purposes of this present invention, the procedure described has been refined in a manner so as to improve the accuracy and reproducibility of results and has been tested on a multitude of different formulations of milk of lime.

According to the present invention, the rate of dissolution of the slaked lime in deionised water is measured in the form of an increase in the electrical conductivity of the solution, under conditions in which the solution remains below the saturation point with respect to calcium hydroxide. In order to ensure that it remains below the saturation point, 0.1 g of hydrated lime is added to 700 g of water at 25° C., which enables the solution to remain well below the solubility point of calcium hydroxide which is about 1.5 g per litre of solution at 25° C. (see for example the document "Solubilities of Inorganic & Metalorganic Compounds—Volume 2", A Seldell, W F Linke, 1953, van Nostrand (publ.), p. 631).

To achieve this accurate and reproducible measurement, 500 g of suspension containing 2% by weight of slaked lime to be characterised is prepared, that is 10 g of slaked lime in 490 g of water. This suspension and 700 g of deionised water are thermostatted at exactly 25° C. A conductivity cell with a response time of 0.05 sec or less s used to record automatically, by means of a data logger, the conductivity of the sample of 700 g of deionised water which is stirred vigorously throughout the measuring process, for example at a speed of 450 rotations per minute (rpm) with a propeller rod stirrer having a diameter of 30 mm.

At the beginning of the measurement, 5 cm of the suspension of 500 g are injected into the sample of 700 g of deionised water and the conductivity value is recorded over time until the latter remains stable having thus reached a maximum value. The time to reach this maximum conductivity since the beginning of the measurement is denoted by $t_{100}$. In a similar manner $t_{90}$ is defined as the time to reach 90% of the maximum conductivity. It is this obtained value $t_{90}$ which is considered to represent the reactivity of milk of lime. More details on the procedure for measuring the reactivity of milk of lime are available in section § 6.11. "Determination of the solubility index by conductivity" of the standard EN 12485: 2010.

Therefore according to the present invention, it is considered that the reactivity of milks of lime will be high if the magnitude of $t_{90}$ is less than or equal to 10 sec.

The document entitled "Studies on the particle properties of suspended hydrated limes'. U. Wittneben, Zement-Kalk-Gips, Edition B, Vol. 33 (10), p. 526-534, 1980" by Wittneben et al of the Research Association of the German Lime Industry (Forschungsgemeinschaft des Verbands der Deutschen Kalkindustrie) also discloses that the differences in the shape of particles, in the size of particles and in the distribution of particle sizes play a significant role in determining the viscosity of the milk of lime. This is further confirmed by the recent work of Rodriguez-Navarro et al ("Microstructure and rheology of lime putty"', E Ruiz-Agudo and C Rodriguez-Navarro, Langmuir: the ACS journal of surfaces and colloids. Vol 26 (6), pp. 3868-3877, 2010). In this document, in FIG. 4a, which is to be reviewed along with FIG. 4b, a profile of particle sizes obtained by TEM (Transmission Electron Microscopy) digital image analysis can be seen that thus necessarily only reveals particles sizes between 0.01 µm and 1 µm, the remainder of the particles is illustrated in FIG. 4b and shows a multimodal profile. These authors have studied the suspensions produced from lime from different origins and have concluded that there is a link between the reactivity of the quicklime and the size, stability, and also the interaction of the particles of slaked lime in suspension.

The authors were also able to correlate the influence of the shape, stability and interactions of particles on the viscosity of the suspension, but also on the flocculation and agglomeration behaviour of the slaked lime particles of the suspension or of the milk of lime.

Since the agglomeration and the formation of flocs from slaked lime particles alter the apparent particle size and distribution of the size of slaked lime particles, it is a logical conclusion that the agglomeration and the formation of flocs from slaked lime particles also alter the external surface of the particles, which is itself linked to the reactivity of the milk of lime.

In conclusion, the milk of lime produced by limes of various origins and having varied reactivity values would commonly display, even under identical conditions of slaking, rheological properties and reaction properties that are different. Moreover, since the reactivity of quicklime is generally dependent on the type of oven used for the calcination of limestone into quicklime, the type of oven would also play a role in determining the properties of the milk of lime, in addition to the influence of the origin of the limestone.

Thus substitution of the quicklime from a specific production site having characteristics that result from a particular combination of the origin of the limestone, the type of oven used and the reactivity of the quicklime with the quicklime from another specific production site having characteristics resulting from another combination including a different origin of limestone, another type of oven used and another reactivity of quicklime could lead to significant changes in the properties of the milk of lime which would result therefrom. This would necessarily have consequences with respect to the subsequent industrial application of this milk of lime.

In other words, the use of milk of lime for a particular application does not only entail choosing a feasible compromise between an acceptable viscosity and the required reactivity of milk of lime, but also signifies that the conditions applied so as to produce such a suspension of lime could only be applied to a limited number or possibly to a single source of commercially available lime. In extreme cases, this would mean that only one single source would be technically possible and economically feasible for producing a milk of lime having specific viscosity properties and a predetermined rate of reaction.

There is therefore a real need to develop milks of lime whose properties would be optimal and consistent, regardless of the sources of limestone and burning method used.

With regard to this subject, milks of lime have been disclosed in the literature and have properties that are optimised for specific applications.

The documents WO 96/23728, DE 2714858, DE 4447321 A1, JP 2007/031212 A, CN 201316654 Y, SU 1186248 A, EP 1039964 B1 and SE 870408 disclose methods for processing of milks of lime in which the properties of these suspensions are optimised for various applications by deagglomeration and even grinding of the milk of lime—which makes it possible to obtain reduced particle sizes—by different types of equipment that at times may be very expensive.

Even though these documents teach ways to effectively increase the reactivity of the milks of lime, the result thereof is nevertheless a negative impact on the viscosity of the milks of lime thus obtained. In many cases, moreover, the authors compensate this increase in viscosity by a dilution in order to reduce the solids content, which is by no means desirable for many applications in that increasing amounts of water are therefore inevitably introduced, which leads to levels of dilution that are too high for numerous applications.

Moreover, these documents pertaining to the state of the art do not take into account the influence of the origin of limestone, of the type of oven used and the reactivity of the hydrated lime obtained and therefore do not mention any solutions to compensate for variations related to these influences.

For example according to the document DE 27148858, at the time of the industrial exploitation, it had been demonstrated that the proposed method and equipment thereof functioned in a reliable manner and as a result provided an appropriate quality of milk of lime only if powdered quicklime of ultra high quality, and ultra high purity and having a homogeneous reactivity was used, thereby greatly complicating the operation of the process disclosed.

Other limes of ultra high purity and very good quality have been described and used to produce highly reactive milks of lime with fine particles. According to the document CN 201316654 or the document EP 1039965, the slaking of high purity lime is carried out in a ball mill. Unfortunately, these technologies require the use of a source of very pure quicklime, thus impeding the production of a product with broad industrial applicability on account of high costs and limited availability.

According to the documents SU 1186248, JP 20071031212 and SE 870408, a high purity quicklime is used in order to produce a suspension of ultra fine slaked lime particles. In the method described, a step of screening by size is introduced so as to eliminate the inert material from the suspension of slaked lime particles obtained. Unfortunately, these techniques are highly dependent on the reactivity of the quicklime and present the major disadvantage of requiring screening or sifting of a suspension of quicklime particles of very high viscosity composed of fine particles.

The document JP 20071031212 discloses another known technique for compensating for the negative effect of the increase in viscosity, namely the use of dispersant additives, which act on the repulsion between the slaked lime particles and in this way diminish the viscosity of the resulting suspension (see also document US2004/0258612).

Unfortunately, these additives are in many cases undesirable for the end user as they result in the addition of an "impurity" in the milk of lime and therefore in the process of the end user or in the finished product, not to mention that sometimes an active interference between the dispersant and the process or the final application has to be reckoned with, mainly because of the nature of the active surface of the majority of these additives.

It is also a known practice to reduce the specific surface area of the particles so as to reduce the viscosity (see document WO2005/014483).

The invention aims to overcome the drawbacks of the state of the art by providing an ultra fine milk of lime having high reactivity and low viscosity which can use any source of quicklime, without resorting to the use of special additives such as dispersants.

In order to solve this problem, the aim is to provide, according to the invention, a high reactivity composition of milk of lime as indicated at the beginning characterised in that said particles of slaked lime are composed of slaked lime particles that have a particle size described by a particle size distribution profile that is narrow and monomodal.

Within the context of the present invention the terms "narrow distribution profile" or "narrow particle size distribution profile" are understood to mean that the difference between $d_{90}$ and $d_{10}$ is less than or equal to 15 microns, preferably less than or equal to 10 microns. The notation $d_x$ with $0<x<100$ represents a diametre, expressed in microns, relative to which x % of the particles are smaller.

The product according to the present invention is thus based on an ultra fine milk of lime, whose particle size distribution profile is narrow and monomodal (where the width of the distribution profile at $d_{90}$-$d_{10}<15$ μm), that is to say, which has a single narrow peak corresponding to a single family of sizes of slaked lime particles. The slaked lime particles therefore have a high reactivity (rate of dissolution) because of their fineness while having a reaction behaviour that is homogeneous because of the homogeneity of the size of particles obtained.

Indeed, conventional milks of lime typically have a particle size distribution profile which is multimodal (having multiple peaks) and therefore include several populations of slaked lime particles. These different populations of particles would typically be composed of fine fractions having increased reactivity and coarser fractions having reduced reactivity. In addition other intermediate fractions may be present, depending on the modes of the particle size distribution profile observed. These intermediate fractions react according to different rates of reaction. This distribution of reactive behaviour due to various rates of reaction results in a reaction behaviour (reactivity) of the milk of lime that is non homogeneous, which is problematic for numerous applications, as mentioned here above. Applications that are dependent on the rate of dissolution of the milk of lime include by way of example, however without any limitation, the rapid neutralisation processes, especially during the production of precipitated calcium carbonate—PCC, processes of synthesis of chemical products such as ethylene oxide or propylene oxide or even flue gas treatment processes.

The high reactivity milk of lime having a particle size distribution profile that is narrow and monomodal according to the present invention does not have any distribution of the rate of reaction. On the contrary, the milk of lime composition according to the present invention reacts in a homogenous manner because of the homogeneous distribution of the slaked lime particles in the reaction medium, which is due to the narrow and monomodal particle size distribution profile and therefore due to the homogeneity of the size of particles.

For example, it is known that in the production of PCC, particles of $Ca(OH)_2$ having a particle size distribution profile that is broader leads to a particle size distribution profile for the PCC that is also broader, which is by no means desirable since one of the advantages of PCC relative to ground calcium carbonate lies precisely in a narrow particle size distribution.

A milk of lime according to the invention having a narrow and monomodal particle size distribution profile makes it possible to achieve precisely this narrow particle size distribution profile in the PCC production and thereby improves the quality thereof.

Another example can be found in the use of milk of lime in the production of propylene oxide, which perfectly illustrates the importance of lime with high and homogeneous reactivity as a reagent in chemical reactions. Propylene oxide is synthesised on an industrial basis primarily for the production of epoxy resins. During the steps of synthesis, dichlorohydrin ($ClH_2C$—$CHOH$—$CH_2Cl$) reacts with a hydroxide (sodium hydroxide, or preferably calcium hydroxide) in epichlorohydrin ($H_3C_2O-CH_2Cl$), to generate the desired epoxy group ($C_2O$).

This reaction must be rapid since epichlorohydrin has the tendency to react with water from the reaction medium to form monochlorohydrin ($CH_2OH-CHOH-CH_2Cl$) and then glycerol ($CH_2OH-CHOH-CH_2OH$), which destroys the epoxy groups. It is therefore essential in this type of application to be able to avail of high reactivity milk of lime in order to achieve high reaction yields, and to be able to extract the epichiorohydrin formed from the reaction medium as quickly as possible. This can only be carried out in a subsequent step of the process, meaning that the withdrawal of epichlorohydrin may be performed only when the reaction of epichlorohydrin formation has ended, so as to avoid the presence of dichlorohydrin which has not reacted. Indeed, the presence of dichlorohydrin remaining unreacted would be detrimental to the overall performance and yield of the reaction relating to epichlorohydrin formation and would remain in the form of impurities within the process.

The milk of lime according to the present invention is therefore an ideal candidate for the process of production of epichlorohydrin, in that it has a rate of reaction that is very high due to its ultra fineness and is homogeneous, due to its narrow and monomodal particle size distribution profile.

Advantageously, the particles have a particle size $d_{98}<10$ µm (microns) and/or a particle size $d_{90}<1.5$ µm and/or a particle size $d_{30} \leq 1$ µm as measured by sedimentation (for example with a Micromeritics Sedigraph apparatus).

Alternatively, said particles have a particle size $d_{98}$ less than or equal to 10 µm and or a particle size $d_{50}$ less than or equal to 3 µm, preferably less than or equal to 2.5 µm, in particular less than or equal to 2 µm, and/or a particle size $d_{10}$ less than or equal to 1 µm, preferably $d_{25}$ less than or equal to 1.5 µm, in particular less than or equal to 1 µm, as measured by laser diffraction.

As can be seen from the values of particle sizes given here above, the particles are very fine, in addition to presenting a narrow and monomodal particle size distribution profile, which is contrary to the teaching of document EP0943590.

Advantageously, the size $d^{10}$ of the particles is greater than or equal to 0.1 µm, as measured by laser diffraction, and this is so, unlike conventional milks of lime that do not have this fineness. In a particular embodiment, the composition of slaked lime according to the present invention has a viscosity less than 350 mPa·s (millipascal second), preferably less than 250 mPa s, and in a more preferential manner less than 200 mPa s, in an advantageous fashion less than 100 mPa s as measured by a standard Brookfield DV-III Rheometer equipped with a 3 or 63 spindle, at a speed of rotation of 100 rotations per minute (rpm).

Preferably, the composition is a suspension of slaked lime in the form of milk of lime having a solids content greater than or equal to 2%, advantageously greater than or equal to 5%, in a preferential manner greater than or equal to 10%, in particular greater than or equal to 12%, in a particularly preferential manner greater than or equal to 15%, relative to the total weight of the suspension. In general, the composition according to the invention is a suspension (slurry) of slaked lime having a solids content less than or equal to 30%, in particular less than or equal to 25%.

In a particularly advantageous embodiment according to the invention, the slaked lime particles have a rate of dissolution in distilled water, as measured by the KIWA procedure such that 90% of the particles of slaked lime are dissolved in less than 10 seconds, in particular in less than 8 seconds, preferably in less than 5 seconds, and in a more preferential manner in less than 3 seconds.

Other embodiments of the composition of slaked lime according to the invention are indicated in the appended claims.

The invention also relates to a method for the production of high reactivity milk of lime, comprising of the following consecutive steps of:
a) the slaking of quicklime by applying a proportion by mass of quicklime relative to water greater than 1 to 8, in particular 1 to 6, and less than 1 to 3 so as to form a lime suspension,
b) particle size cutting of said lime suspension, possibly diluted, with the obtaining of at least one coarse first fraction to be ground and one fine second fraction
c) particle size reduction by wet ball grinding of said at least one coarse first fraction to be ground and
d) obtaining of said milk of lime with high reactivity, possibly after dilution.

The method according to the present invention has the great advantage of allowing the use of any type of industrial lime having an altogether standard reactivity and chemical properties, without the need for resorting to a base of high purity lime, in order to produce a suspension of lime which may be granulometrically cut with ease. The step of particle size cutting or screening eliminates the inert material as well as any type of particles that are too large in size, such as calcium carbonate in the unfired form or all other impurities such as silica, for example. The wet ball grinding of the said at least one coarse first fraction to be ground, resulting from the step of particle size cutting, leads to a product in the form of a slaked lime suspension whose constituent particles are very fine and in a very reliable manner present a narrow and monomodal particle size distribution profile and which can be controlled.

Moreover, the optimisation of the process according to the invention makes it possible to reduce the increase in viscosity originating from the increase in fineness of the particles in order to improve the reactivity of the milk of lime according to the invention.

The method according to the present invention thus makes it possible to produce a milk of lime that is superior to conventional milks of lime in terms of rate of reaction and reaction behaviour, for a wide range of applications as mentioned here above, since it has a narrow and monomodal particle size distribution profile.

The term "monomodal" in this context signifies that the measured differential distribution of the size of particles obtained by conventional measurement methods described here above shows only one single mode or peak, preferably distributed evenly around the value of $d_{50}$.

Conventional slaked lime, which is a nanocrystalline material, comprises aggregates and agglomerates of nanocrystals of calcium hydroxide of 20 to 120 nm and therefore typically presents a particle size distribution profile that is broad and multimodal. Reduction of the size of particles of this conventional slaked lime indeed requires more than just the simple grinding or simple conventional particle size reduction in order to obtain a monomodal and narrow distribution.

In fact, the release of individual nanocrystals or submicron aggregates during the slaking, particle size cutting and granulometric reduction should be kept as low as possible given that, as such, these fine nanoscale particles have a tendency to significantly increase the viscosity.

Moreover, some of these nanoparticles are crystallographically unstable and recrystallize, which changes the viscosity by increasing it or decreasing it, which is obviously not desirable because these changes in the rheological properties of the suspension are neither controllable nor predictable.

As it is known by the person skilled in the art, during the wet grinding in a ball mill, the particles of the material being ground are broken due to the energy transferred by the balls to the slaked lime particles during collisions, which moreover also depends on the mass of the balls, typically 1.5 to 2.5 kg of balls per cubic decimetre ($dm^3$) of mill, and on their speed related to the stirring (speed of rotation of the mill). This transferred energy must exceed the minimum breaking energy of the particles, in order to induce the breaking of the particles of slaked lime. The rate of stirring and energy depend on the volume of the wet mill. For example, for a mill of 100 $dm^3$, the rate of stirring is of the order of 650 rpm, with 55 to 75 kW of power; for a mill of 0.5 $m^3$, the rate of stirring is about 350 rpm and with 160 to 200 kW of power. At the same time, it is necessary to avoid inducing excessive energy which would lead to excessive fragmentation and to the equally unsuitable generation of submicron fragments.

This minimum breaking energy is commonly a property of the material, but in the case of slaked lime it also depends on the source of the lime, on the conditions of slaking and the fractionation of the size of particles. These criteria are thus used to optimise the grinding, which enables the production of a milk of lime for which the particle size distribution profile is narrow and monomodal. Quite certainly, to know the rate of submicron particles is also considered a critical factor.

Advantageously, the said particle size reduction (granulometric reduction) by ball grinding is carried out in a ball mill containing balls of oxide or zirconium silicate or glass for grinding which are less than 1.4 mm in size.

In a particular embodiment, said particle size cutting comprises a screening by size on a vibrating screen with mesh size of 250 μm, preferably with mesh size less than or equal to 100 μm and wherein said coarse first fraction to be ground is the fraction passing through the screen with mesh size of 250 μm, preferably with mesh size less than or equal to 100 μm and said fine second fraction is a fraction of rejected residue essentially consisting of inert particles or impurities to be removed.

In a variant, said particle size cutting comprises a double screening by size on a first vibrating screen with mesh size of 250 μm, and on a second vibrating screen with mesh size less than or equal to 100 μm, with the obtaining of a coarse first fraction to be ground, of a fine second fraction and a third fraction, wherein said coarse first fraction to be ground is the fraction passing through the meshes of the 250 μm screen and rejected as residue at the screen with mesh size less than or equal to 100 μm, said fine second fraction is a fraction of residue rejected at the 250 μm mesh screen, essentially consisting of inert particles or impurities to be removed and said third fraction is a fraction passing through the meshes of the screen with mesh size less than or equal to 100 μm. This third fraction is generally to be ground.

In a variant according to the present invention, the said particle size cutting is carried out by hydrocycloning of said lime suspension, possibly diluted, with the obtaining of a fraction of particles whose particle size is less than 10 μm as the second fraction and a fraction of particles having a particle size greater than 10 μm as the coarse first fraction to be ground and wherein said milk of lime having high reactivity to water is obtained by mixing of said fine second fraction and said ground coarse first fraction, possibly after dilution.

In yet another alternative embodiment according to the present invention, the particle size cutting comprises a first step of screening by size on a vibrating screen with mesh size of 250 μm, preferably with mesh size less than or equal to 100 μm, making it possible to obtain an accepted fraction passing through the meshes of the screen with 250 μm mesh size, preferably with mesh size less than or equal to 100 μm and a fraction of rejected residue essentially consisting of inert particles or impurities to be removed, and a second step of hydrocycloning of said accepted fraction, possibly diluted, with the obtaining of a fraction of particles whose particle size is less than 10 μm as the second fraction and a faction of particles having a particle size greater than 10 μm as the coarse first fraction to be ground and wherein said milk of lime having high reactivity to water is obtained by mixing of said fine second fraction and said ground coarse first fraction, possibly after dilution.

In a variant, according to the invention, the said particle size cutting comprises a first step of double screening by size on a vibrating screen with mesh size of 250 μm, and on a vibrating screen with mesh size less than or equal to 100 μm, with the obtaining of an accepted fraction passing through the meshes of the screen with 250 μm mesh size but rejected as residue at the vibrating screen with mesh size less than or equal to 100 μm, of a fraction of residue rejected at the vibrating screen with 250 μm mesh size, essentially consisting of inert particles or impurities to be removed, and of a fraction accepted at the vibrating screen with mesh size less than or equal to 100 μm, as well as a second step of hydrocycloning of at least one of the accepted fractions, possibly diluted, with the obtaining of at least one fraction of particles whose particle size is less than 10 μm as the fine second fraction and at least one fraction of particles whose particle size is greater than 10 μm as the at least one coarse first fraction to be ground and wherein said milk of lime having high reactivity to water is obtained by mixing of said fine second fraction and the at least one ground coarse first fraction, possibly after dilution.

As it may be noted, said step of particle size cutting can be carried out in different ways by selecting one or more steps of particle size cutting in the form of vibrating screen or hydrocycloning processes. The vibrating screen with 250 μm mesh size can be coupled with a hydrocyclone or with one or more other screens with lower mesh sizes such as, for example, mesh sized 10 μm or less, possibly also coupled with a hydrocyclone.

More particularly, in the method according to the present invention, said at least one ground coarse first fraction and said fine second fraction are mixed in a proportion of between 20% and 75% for the first coarse fraction and 25% and 80% for the second fraction, possibly after dilution.

Advantageously said quicklime is a quicklime having a reactivity $t_{80}$ measured according to the reactivity test described in the standard EN459-2 within a range of 0.5 to 20 minutes, preferably between 1 to 10 minutes, preferably less than 5 minutes.

In an advantageous embodiment, the slaking is carried out with water, for example process water at a temperature of about 40° C.

In a particularly advantageous embodiment of the method according to the present invention, said slaking is carried out in a lime paste slaker.

Other embodiments of the method according to the invention are set forth in the appended claims.

Other characteristic features, details and advantages of the invention will become apparent from the description given here below, without limitation and with reference being made to the accompanying drawings.

In the figures, identical or similar elements have the same identifying references.

The present invention therefore relates to a method of producing a suspension of milk of lime in three steps that make it possible to produce an ultra fine milk of lime with high reactivity wherein the particle size distribution profile is narrow and monomodal.

The first step consists of slaking the quicklime in a paste slaker in order to produce an aqueous suspension of lime, the second step consists of an operation of particle size cutting also known as particle size screening which makes it possible amongst other things, to eliminate the inert particles and impurities such as silica or limestone from the lime suspension, possibly diluted. The third step is a step of wet ball milling which makes it possible to obtain a particle size distribution profile that is narrow and monomodal along with a reduced inert particles content.

This particular narrow and monomodal particle size distribution makes it possible to obtain an ultra fine milk of lime that is homogeneous in terms of particle sizes and has high reactivity that is also homogeneous.

In one embodiment according to the present invention, the accepted fraction of milk of lime output from the 250 µm vibrating screen is processed in a second step of particle size cutting like for example in a hydrocyclone or with one or more vibrating screen/s having smaller mesh size, in order to obtain a fraction the particle size of which is already as expected and at least one coarser fraction to be ground.

Each coarser fraction or one or more of them are then ground according to the present invention in a step of wet grinding in a ball mill in order to form particles of slaked lime having a narrow and monomodal particle size distribution profile that is well defined in the context of the present invention. The accepted fine fraction, the particle size of which is already as expected and at least one of the coarser ground fractions are then mixed or used separately.

In one variant according to the invention, the quicklime is slaked in a stirred reactor, in a ball mill or in a high shear stress slaker, instead of a lime paste slaker, provided that the slaked lime particles are not too small in size, which would hamper any further particle size cutting to eliminate the inert fraction, on account of the possible clogging of the screen caused.

As it may be noted, the choice of conditions for slaking and particle size cutting depends largely on the characteristics of the milk of lime resulting from the source of quicklime. The object of the invention is to produce, regardless of the characteristics or qualities of the source of lime, a composition having a milk of lime base, of which the particle size distribution profile is narrow and monomodal. The flexibility achieved by the method according to the invention with respect to the source of lime is not the only advantage. In fact, the method also allows for the use of different sources of slaking water unlike in the previous documents where water had also to be of high purity. In addition, the loss during screening is reduced, which offers significant economic benefits.

The milk of lime according to the present invention, having said narrow and monomodal particle size distribution profile enables the use thereof in applications with short processing periods such as rapid neutralisation processes, synthesis of chemical products consuming slaked lime, rapid softening of water or mineralisation of the latter or even the precipitation of calcium carbonates.

The composition of milk of lime according to the present invention is thus characterised by the fact that said particles advantageously have a particle size $d_{98}<10$ µm, a particle size $d_{50}<1.5$ µm and a particle size $d_{30}<1$ µm as measured by sedimentation (for example with a Micromeritics Sedigraph apparatus), and/or a particle size doe less than or equal to 10 µm, a particle size $d_{50}$ less than or equal to 3 µm, preferably less than or equal to 2.5 µm, in particular less than or equal to 2 µm and a particle size $d_{10}$ less than or equal to 1 µm, preferably $d_{25}$ less than or equal to 1.5 µm, preferably less than or equal to 1 µm, as measured by laser diffraction by means of using a device of the type Beckmann-Coulter LS 13 320 or Horiba LA950.

The viscosity of the milk of lime according to the present invention is less than 350 mPa s, preferably less than 250 mPa s, and in a more preferential manner less than 200 mPa s, in an advantageous manner less than 100 mPa s, as measured by the standard Brookfield Rheometer DV-III with a speed of rotation of 100 revolutions per minute.

The solids content of the milk of lime according to the present invention is in addition greater than or equal to 2%, advantageously greater than or equal to 5%, in a preferential manner greater than or equal to 10%, in particular greater than or equal to 12%, In a particularly preferential manner greater than or equal to 15%, relative to the total weight of the suspension. In general, the composition according to the invention is a suspension of slaked lime having a solids content less than or equal to 30%, in particular less than or equal to 25%.

Finally, the rate of dissolution in distilled water of the lime milk according to the present invention, as measured by the KIWA procedure, is advantageously such that 90% of the particles of slaked lime are dissolved in less than 8 seconds, preferably in less than 5 seconds and in a more preferential manner in less than 3 seconds.

EXAMPLES

Example 1

3 samples of lime B, D, E, from three different geographical sources (respectively north of France, Portugal and central France) having a behaviour with respect to formation of milk of lime that is similar during slaking are slaked in a vertical hydrator measuring 15 dm$^3$ equipped with a propeller rod stirrer, that is 70 mm in diametre, by adding hot water at a temperature of 40° C. to quicklime, based on a lime/water proportion of ⅕ by weight. The processing time period is 30 minutes with a speed of rotation of 400 rpm. The milks of lime thus obtained are screened on a vibrating sieve with mesh size of 90 μm. Each fraction accepted is diluted until a suspension of 15% by weight of solid material is obtained and is wet ground in a ball mill filled up to 85% with glass balls that are 0.8 mm to 1.2 mm in size, at a speed of rotation of 2200 rpm for a period of about 2.5 min until the obtaining of a $d_{98}$<10 μm and a $d_{50}$<3 μm as measured by laser diffraction.

that is slightly different compared to the three limes of Example 1 are hydrated, screened and ground under the same conditions as in Example 1. Before grinding, suspension A has a viscosity that is significantly higher than that of suspensions B, D and E. For suspension C, the viscosity is much higher. After grinding, suspension A has a moderately higher viscosity and suspension C is far too viscous for proper industrial handling (see table). In both cases, the high viscosity of the suspension can be avoided by adjusting the conditions of slaking in particular by reducing the temperature of the slaking water by around 15° C. and/or by decreasing the stirring by about 200 rpm, in order to obtain particles the breaking energy of which is higher or by using grinding conditions which provide less energy per collision (see Example 2).

Example 2

Lime samples A and C are hydrated and screened under the same conditions as in Example 1, but ground at 2100 rpm with finer balls that are between 0.5 mm and 0.7 mm in size, that is to say, which transmit about 60% lower energy by collision. Even though the fraction of unground slaked lime (A1 and C1) is similar to that in Comparative Example 1, and despite the fact that the ground slaked lime (A1 and C1) is finer than the ground lime in Comparative Example 1 (A and C), the viscosity of the suspension C1 is significantly reduced (see table) and the viscosity of the suspension A1 is not very strongly increased, in spite of the extreme fineness of the milk of lime obtained having a $d_{98}$ of about 5 μm, a $d_{50}$ of about 1.5 μm and du of about 1 μm.

TABLE analytical results pertaining to the suspensions in Examples 1 and 2 and in Comparative Example 1. The distribution of particle size was measured by means of the device Beckmann-Coulter Laser Diffraction Particle Sizer LS 13 320

| Sample | % Solid | Viscosity (mPa · s) | KIWA $T_{100}$ (s) | $T_{90}$(s) | Distribution of particle sizes of a milk of lime that is screened but not ground | | | | |
|---|---|---|---|---|---|---|---|---|---|
| | | | | | $d_{98}$ (μm) | $d_{95}$ (μm) | $d_{90}$ (μm) | $d_{50}$ (μm) | $d_{25}$ (μm) |
| A | 15.1 | 140 | 65.4 | 9.4 | 61.0 | 42.2 | 28.3 | 5.7 | 2.5 |
| B | 15.1 | 10 | 92.5 | 20.9 | 78.2 | 58.0 | 39.0 | 7.3 | 3.1 |
| C | 15.2 | 350 | 55.3 | 9.6 | 61.9 | 46.6 | 30.9 | 5.4 | 2.4 |
| D | 15.2 | 45 | 100.5 | 17.4 | 80.1 | 57.9 | 33.4 | 5.6 | 2.7 |
| E | 15.1 | 21 | 64.7 | 15.5 | 73.6 | 55.6 | 35.4 | 6.4 | 3.1 |
| A1 | 15.0 | 140 | 135.4 | 5.0 | 62.1 | 46.2 | 27.9 | 4.7 | 2.2 |
| C1 | 14.8 | 410 | 49.5 | 4.6 | 59.2 | 42.0 | 28.4 | 4.8 | 2.0 |

| Sample | % Solid | Viscosity (mPa · s) | KIWA $T_{100}$(s) | $T_{90}$ (s) | Distribution of particle sizes of a milk of lime that is ground | | | | |
|---|---|---|---|---|---|---|---|---|---|
| | | | | | $d_{98}$ (μm) | $d_{95}$ (μm) | $d_{90}$ (μm) | $d_{50}$ (μm) | $d_{25}$ (μm) |
| A | 15.3 | 390 | 1.8 | 1.6 | 8.9 | 7.7 | 6.5 | 2.3 | 1.4 |
| B | 14.9 | 190 | 4.2 | 3.0 | 9.1 | 7.9 | 6.6 | 2.4 | 1.4 |
| C | 15.2 | 1760 | 4.8 | 2.8 | 8.9 | 7.7 | 6.4 | 2.2 | 1.3 |
| D | 14.9 | 265 | 13.7 | 0.8 | 9.2 | 8.0 | 6.7 | 2.4 | 1.4 |
| E | 14.8 | 125 | 5.4 | 4.0 | 8.7 | 7.6 | 6.5 | 2.5 | 1.5 |
| A1 | 15.0 | 530 | 5.6 | 4.6 | 6.1 | 5.1 | 4.1 | 1.6 | 1.0 |
| C1 | 14.7 | 660 | 5.0 | 4.6 | 4.9 | 4.0 | 3.0 | 1.4 | 0.9 |

The suspensions obtained have a particle size distribution profile that is narrow and monomodal and a viscosity less than 350 mPa s as mentioned in the table.

Comparative Example 1

Two samples of lime, A and C, from two geographically different sources (southern Poland and south of France) having a behaviour with respect to formation of milk of lime Example 3

In order to illustrate the influence of the conditions of slaking on the grinding of milk of lime and the properties of the ultra fine milk of lime thus obtained, another sample (B1) from the same geographical source as the sample B is hydrated under two different sets of conditions.

In the first case, one portion of the sample is hydrated by adding hot water at a temperature of 40° C. to the quicklime based on a lime/water proportion of ⅕ by weight.

In the second case, another portion of the sample is hydrated by addition of warm water at a temperature of 20° C. based on the same lime/water proportion of ⅕ by weight. The milks of lime thus obtained are then screened on a vibrating screen with mesh size 250 µm and the accepted fractions are then sufficiently diluted so as to obtain a solid content of 13% by weight and divided into different sub samples. These sub samples are then ground under different conditions in a ball mill, in particular by varying the rotation speed of the mill and the processing time period, but generally otherwise, under the same overall conditions as in Example 1, that is to say, with the same size of balls, the same kind of balls, the same fill rate, etc.

Figure 1:
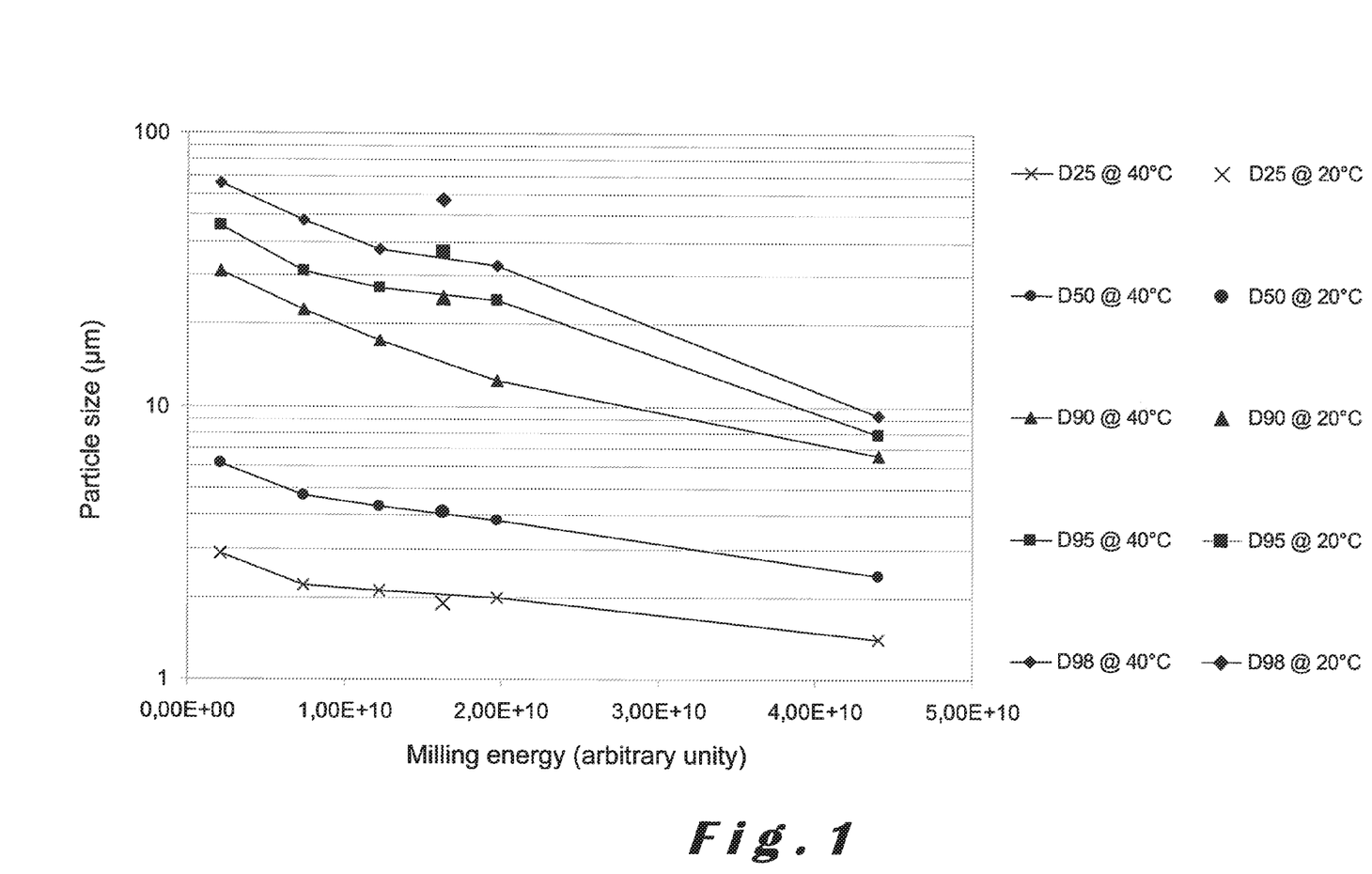
FIG. 1 is a graph representing the distribution of sizes of particles that is narrow and monomodal identified by a set of characteristic diametres for the milk of lime according to the invention depending on the grinding energy applied.
Figure 2:
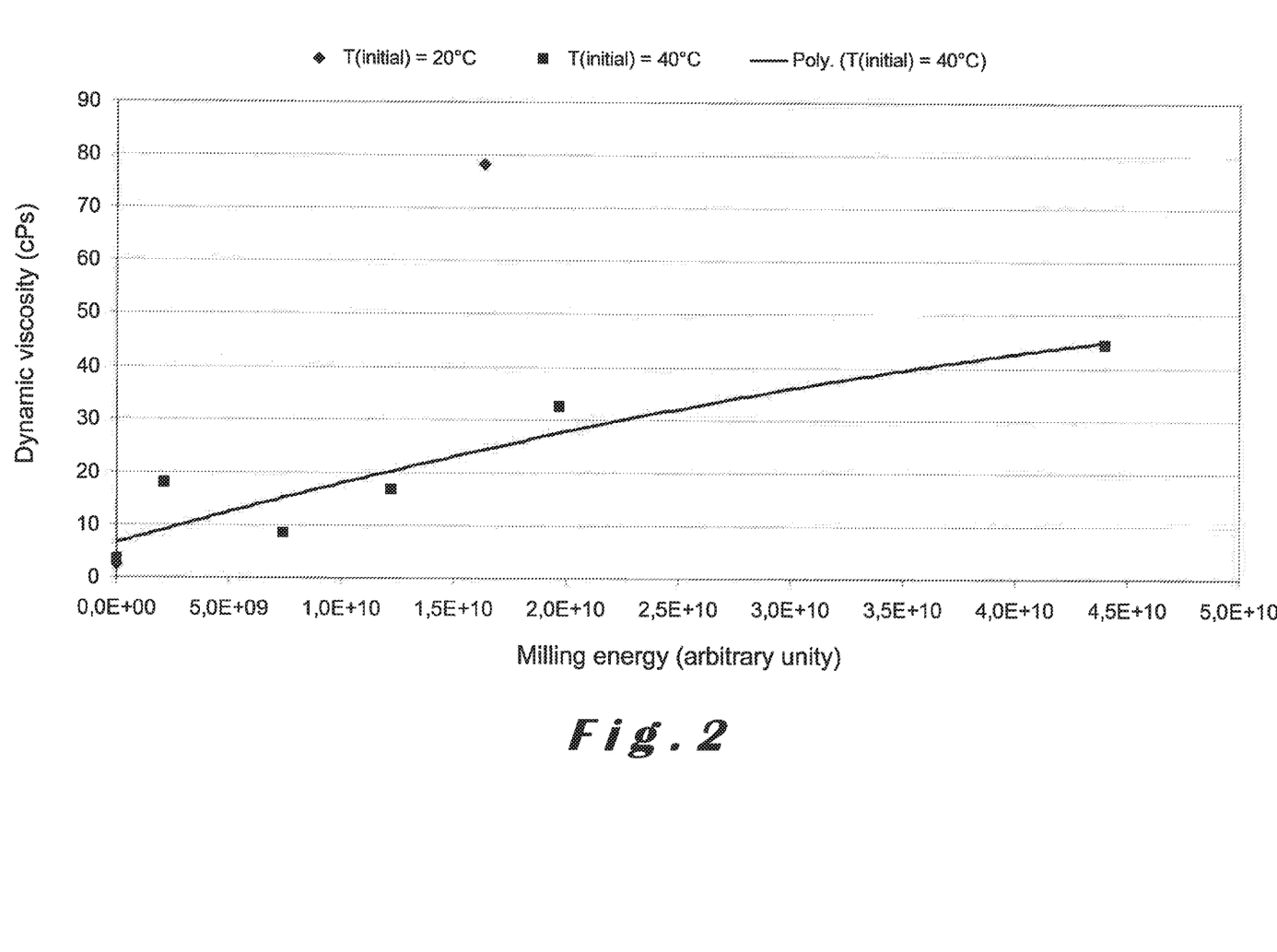
FIG. 2 is a graph representing the measured viscosities of suspensions of milk of lime according to the invention having various grades of fineness, produced under different conditions of grinding (grinding energy applied).
Figure 3:
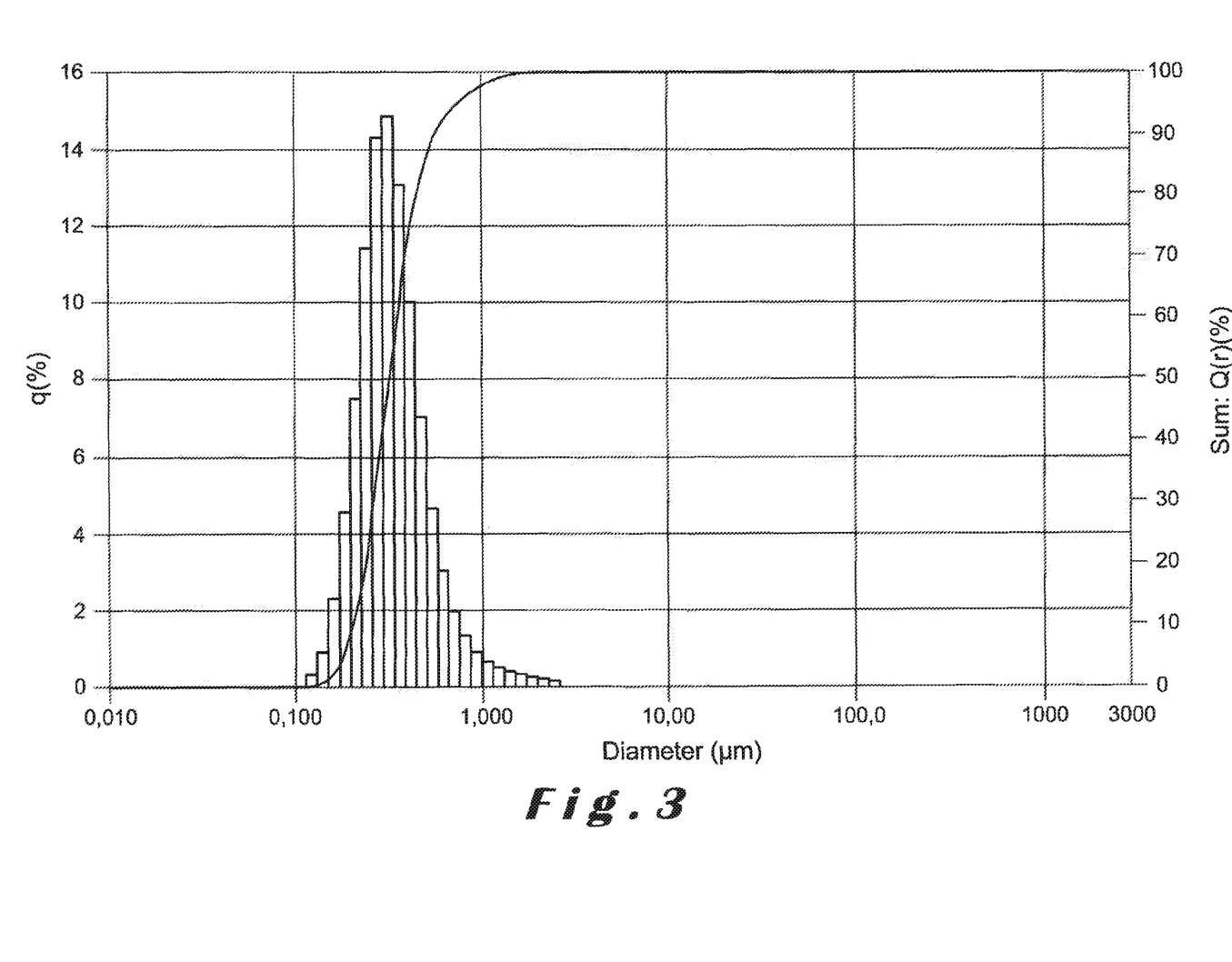
FIG. 3 is a graph representing an example of monomodal distribution of particles of a milk of lime, as measured by laser diffraction.

The distribution of particle sizes obtained is presented in FIG. 1. The measured viscosities of the suspensions obtained are shown in FIG. 2.

In an expected manner, the characteristic diameters decrease when the grinding energy applied increases. However, slaking with water having a temperature of 20° C. results in a fraction of milk of lime having particles which are coarser, that is to say having higher particle sizes $d_{50}$, $d_{95}$ and $d_{98}$. The fractions of milk of lime with larger particles lead to a milk of lime that is coarser post grinding by applying the same grinding energy in comparison with milk of lime hydrated with water having a temperature of 40° C.

While the suspension slaked by addition of water having a temperature of 40° C. may be ground under the conditions presented in FIG. 1 in order to achieve the particle size distribution profile in accordance with the present invention, this was not the case for the milk of lime obtained with water having an initial temperature of 20° C. The milk of lime slaked with water having a temperature of 20° C. is a bit too coarse in terms of $d_{98}$.

Surprisingly, the milk of lime obtained with water initially at a temperature of 20° C. has a higher viscosity in spite of the presence of a fraction of particles of larger size in this milk of lime as compared to that obtained with the slaking water initially having a temperature of 40° C.

In both these two cases, the viscosity increases with the grinding energy applied, that is to say, when the particle size decreases for the respective milks of lime.

It may therefore be concluded that the conditions for slaking, screening or particle size cutting (coarse fraction before grinding) and the conditions for grinding may be optimised in relation to each other in order to produce an improved milk of lime with higher reactivity and reduced viscosity.

It is indeed understood that the present invention is in no way limited to the embodiments described here above and that modifications may well be made thereto without departing from the scope of the appended claims.

The invention claimed is:

1. A method for the production of a milk of lime having a high reactivity defined by a $t_{90}$ less than or equal to 10 sec, comprising the following consecutive steps of:
    a. the slaking of a quicklime by applying a proportion by mass of quicklime relative to water which equates to a ratio by weight in grams of quicklime relative to water greater than 1 to 8, and less than 1 to 3 so as to form a lime suspension;
    b. particle size cutting of said lime suspension, with the obtaining of at least one coarse first fraction to be ground and a fine second fraction;
    c. particle size reduction by wet ball grinding of said at least one coarse first fraction to be ground and
    d. obtaining of said milk of lime having a high reactivity.

2. The method according to claim 1, wherein said particle size reduction by ball grinding is carried out in a ball mill containing grinding balls which are less than 1.4 mm in size.

3. The method according to claim 1, wherein said particle size cutting comprises a screening by size on a vibrating sieve with mesh size of 250 µm, and wherein said at least one coarse first fraction to be ground is the fraction passing through the screen with mesh size of 250 µm, and said fine second fraction is the retained fraction consisting of inert particles or impurities to be removed.

4. The method according to claim 1, wherein said particle size cutting comprises of a double screening by size on a first vibrating screen with mesh size of 250 µm, and on a second vibrating screen with mesh size less than or equal to 100 µm, with the obtaining of said at least one coarse first fraction to be ground, said fine second fraction and a third fraction, wherein said at least one coarse first fraction to be ground is the fraction passing through the meshes of the 250 µm screen and retained on the screen with mesh size less than or equal to 100 µm, said fine second fraction is a fraction of residue retained at the 250 µm mesh screen, consisting of inert particles or impurities to be removed and said third fraction is a fraction passing through the meshes of the screen with mesh size less than or equal to 100 µm.

5. The method according to claim 4, wherein said at least one ground coarse first fraction and said fine second fraction are mixed in a proportion of between 20% and 75% for the at least one coarse first fraction and 25% and 80% for the fine second fraction.

6. The method according to claim 1, wherein the said particle size cutting is carried out by hydrocycloning of said lime suspension, with the obtaining of a fraction of particles whose particle size is less than 10 µm as the fine second fraction and a fraction of particles having a particle size greater than 10 µm as the least one coarse first fraction to be ground and wherein said milk of lime having high reactivity to water is obtained by mixing of said fine second fraction and said at least one ground coarse first fraction.

7. The method according to claim 1, wherein said particle size cutting comprises of a first step of screening by size on a vibrating screen with mesh size of 250 µm, to obtain an accepted fraction passing through the meshes of the screen with 250 µm mesh size, and a retained fraction composed of inert particles or impurities to be removed, and a second step of hydrocycloning of said accepted fraction, with the obtaining of a fraction of particles whose particle size is less than 10 µm as the fine second fraction and a fraction of particles having a particle size greater than 10 µm as the at least one coarse first fraction to be ground and wherein said milk of lime having high reactivity to water is obtained by mixing of said fine second fraction and said at least one coarse first ground fraction.

8. The method according to claim 1, wherein the said particle size cutting comprises of a first step of double screening by size on a vibrating screen with mesh size of 250 µm, and on a vibrating screen with mesh size less than or equal to 100 µm, with the obtaining of an accepted fraction passing through the meshes of the screen with 250 µm mesh size but retained on the vibrating screen with mesh size less than or equal to 100 µm, of a retained fraction retained on the vibrating screen with 250 µm mesh size, composed of inert particles or impurities to be removed, and of a fraction accepted at the vibrating screen with mesh size less than or equal to 100 µm, as well as a second step of hydrocycloning of at least one of the accepted fractions, with the obtaining of at least one fraction of particles whose particle size is less than 10 μm as the fine second fraction and at least one fraction of particles whose particle size is greater than 10 μm as the at least one coarse first fraction to be ground and wherein said milk of lime having high reactivity to water is obtained by mixing of said fine second fraction and the at least one ground coarse first fraction.

9. The method according to claim 1, wherein said quicklime is a quicklime having a reactivity $t_{60}$ measured according to the reactivity test described in the standard EN459-2 within a range of 0.5 to 20 minutes.

10. The method according to claim 1, wherein the slaking is carried out with water.

11. The method according to claim 1, wherein the said slaking is carried out in a lime paste slaker.

* * * * *